United States Patent [19]

Irvin et al.

[11] Patent Number: 4,609,958
[45] Date of Patent: Sep. 2, 1986

[54] PRECISION BEARING FOR RECIPROCATING A MAGNETIC HEAD

[75] Inventors: Ronald D. Irvin, Poway; Karl B. Offerman; Lynn C. Jacobs, both of San Diego, all of Calif.

[73] Assignee: Cipher Data Products, Inc., San Diego, Calif.

[21] Appl. No.: 614,519

[22] Filed: May 29, 1984

[51] Int. Cl.⁴ .................... G11B 5/55; G11B 21/08
[52] U.S. Cl. ........................... 360/106; 360/104
[58] Field of Search ............ 360/104, 106, 107, 109, 360/90, 93, 97, 99

[56] References Cited

U.S. PATENT DOCUMENTS

| | | | |
|---|---|---|---|
| 3,721,967 | 3/1973 | Englert et al. | 360/106 |
| 3,737,880 | 6/1973 | Kelley | 360/99 |
| 3,969,768 | 7/1976 | Ebbing | 360/106 |
| 4,006,372 | 2/1977 | Brown, Jr. et al. | 360/97 |
| 4,261,222 | 4/1981 | Dattilo | 360/106 |
| 4,315,290 | 2/1982 | Kukreja | 360/106 |
| 4,393,425 | 7/1983 | Wright | 360/106 |
| 4,427,905 | 1/1984 | Sutton | 360/106 |
| 4,468,712 | 8/1984 | Mueller et al. | 360/106 |

FOREIGN PATENT DOCUMENTS 0071083  2/1983  European Pat. Off. ............ 360/106

OTHER PUBLICATIONS

A. M. Guzman and T. N. Waller, Voice Coil Motor, Oct. 1977, IBM Technical Disclosure Bulletin, vol. 20, No. 5.

Primary Examiner—John H. Wolff
Assistant Examiner—Andrew L. Sniezek
Attorney, Agent, or Firm—Baker, Maxham & Jester

[57] ABSTRACT

A magnetic head is attached to a hollow carriage which surrounds a hollow cylindrical positioner post rigidly secured at one end to a frame element of a tape drive. Precision ball bearings mounted to the carriage engage the outer surface of the cylindrical positioner post at longitudinally and circumferentially spaced locations. A positioner shaft extends through the positioner post and a tracking nut in one end of the carriage is screwed over a threaded segment of the shaft. A pin extends from the carriage and is longitudinally slidable in a recess in an anti-rotation block mounted on the frame element. A stepper motor can drive the shaft to reciprocate the carriage toward and away from the frame element thereby moving the head traversely with respect to a length of magnetic tape. An adjustable stop on the post limits movement of the carriage toward the frame element.

19 Claims, 6 Drawing Figures

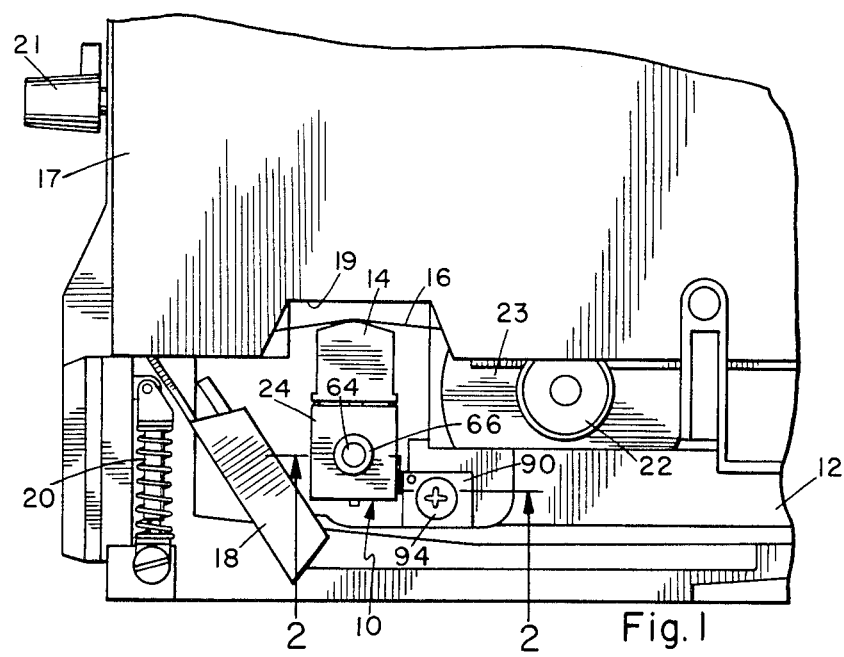
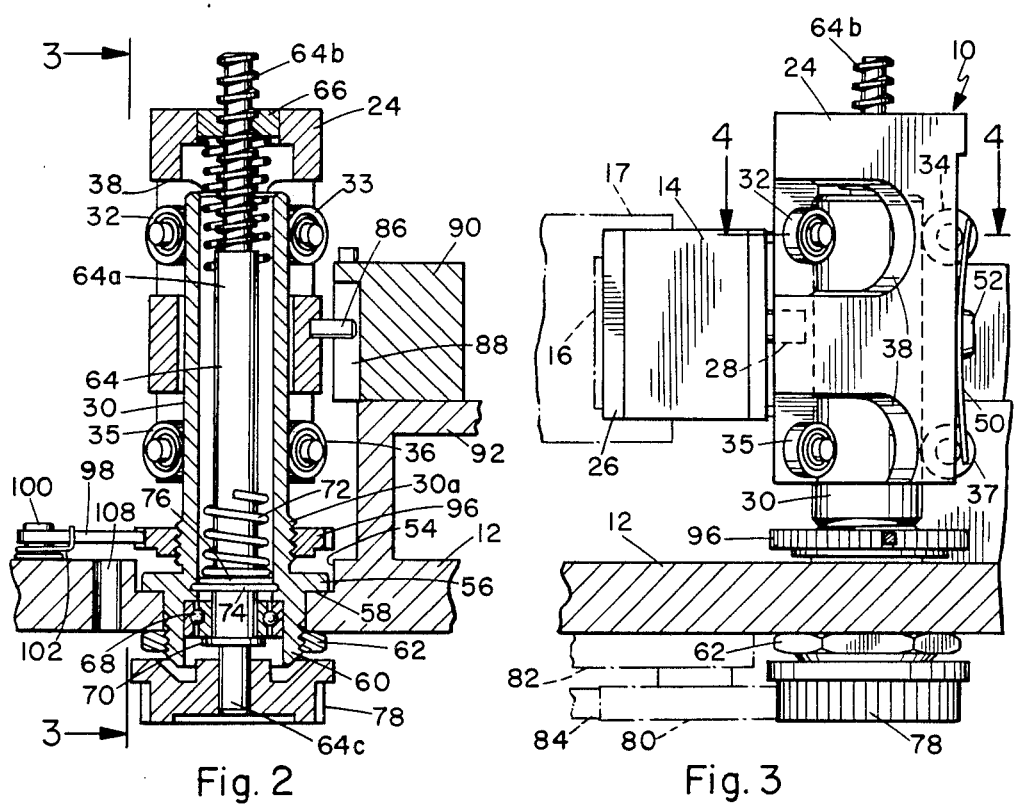
Fig. 1
Fig. 2
Fig. 3

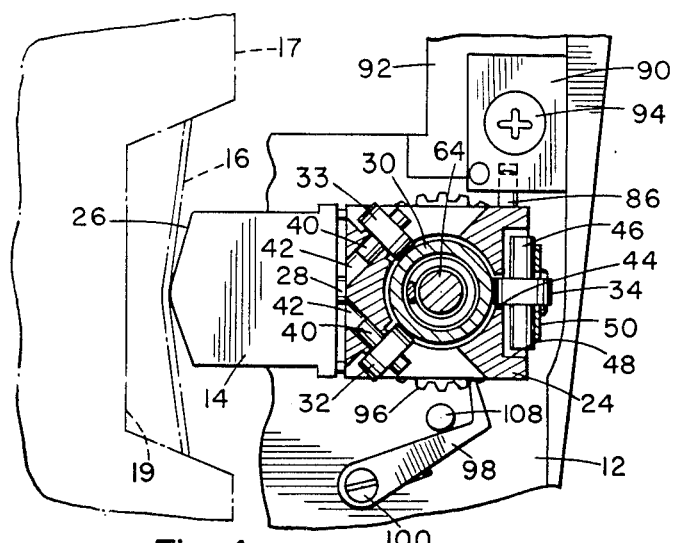
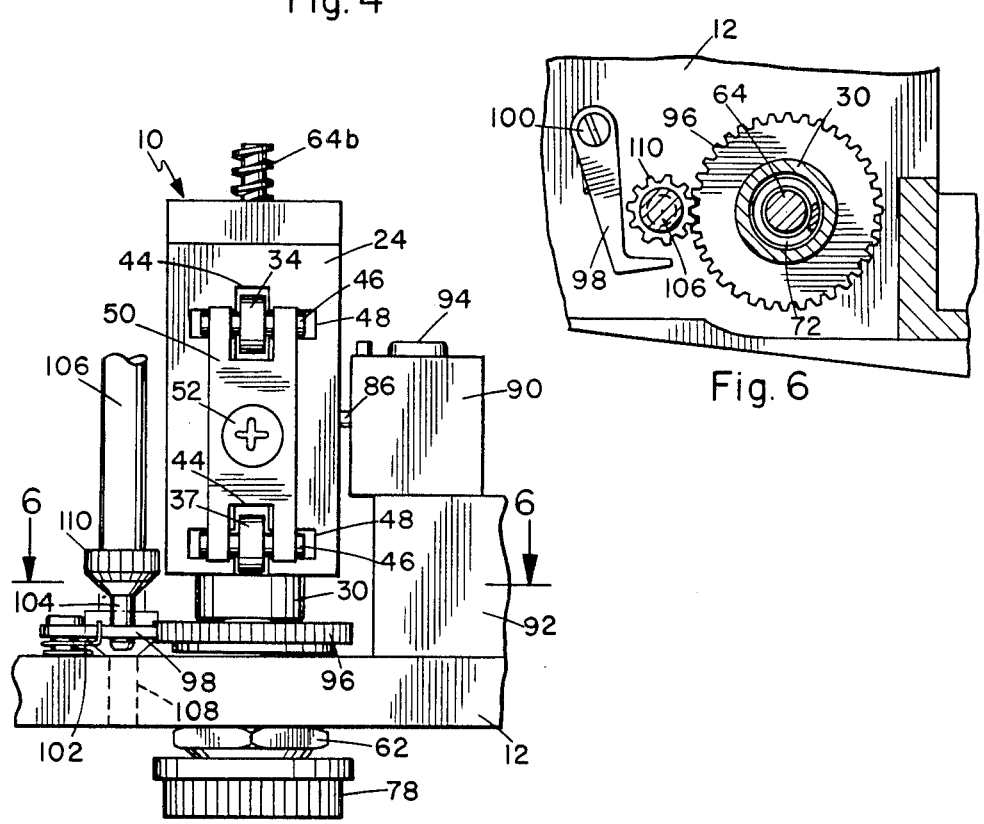

PRECISION BEARING FOR RECIPROCATING A MAGNETIC HEAD

BACKGROUND OF THE INVENTION

The present invention relates to the support and movement of magnetic transducers, and more particularly, to a precision bearing for reciprocating a magnetic tape head.

Information is recorded and read from a moving magnetic storage medium with a transducer in the form of a magnetic head positioned adjacent the medium. Energization of the head and relative movement between the head and medium creates tracks of information on the surface of the medium during recording. These tracks can later be read using the same relative movement.

Data is typically recorded in tracks on a magnetic tape by moving the tape longitudinally past magnetic head, the latter being energized by a electric current representing the information desired to be recorded on the tape. The information is similarly read by moving the tape longitudinally past the magnetic head so that magnetic flux patterns on the tape create an electric current in coils associated with the magnetic head, the current being representative of the information being read.

The need for ever increasing amounts of magnetic media data storage has lead to efforts to obtain greater data density. One way of increasing the density of data stored in a given magnetic data storage medium is to increase the number of tracks and reduce the distance between adjacent tracks. As the spacing between adjacent tracks is reduced, the importance of precise alignment of the magnetic head with a selected track increases. Another way of increasing the density of data stored in a given magnetic storage medium is to increase the number of magnetic flux changes per unit length of data track.

By way of example, in a one-quarter inch cartridge tape drive system, there may be twelve data tracks each of which is 0.013 inch wide and has approximately 10,000 magnetic flux changes per inch. In systems of this type, the movement of the head transverse to the tape length must be very precise. Azimuth variations must be minimized to reduce read errors to acceptable levels when tapes are interchanged between drives.

An example of a magnetic tape drive having a precision bearing for supporting a read/write magnetic head for reciprocation across the width of the tape is disclosed in pending U.S. patent application Ser. No. 441,762 filed Nov. 15, 1982 entitled "Cartridge Tape Drive", assigned to Cipher Data Products, Inc., the assignee of the subject application. The disclosure of the aforementioned application is specifically incorporated herein by reference. The present invention is an improvement over the head bearing disclosed in application Ser. No. 441,762.

SUMMARY OF THE INVENTION

It is the primary object of the present invention to provide an improved precision bearing for supporting and moving a magnetic transducer with respect to a moving magnetic storage medium.

It is another object of the present invention to provide an improved bearing for supporting a magnetic head for recording and reading data in multiple tracks on magnetic tape.

It is another object of the present invention to provide a bearing of the aforementioned type which is capable of very accurate transverse positioning of the head with respect to the tape.

Another object of the present invention is to provide a bearing of the aforementioned type that will minimize azimuth variations.

Another object of the present invention is to provide a bearing of the aforementioned type which has an adjustable stop.

Another object of the present invention is to provide a bearing of the aforementioned type which permits the position of the head to be readily adjusted with respect to a reference.

In the illustrated embodiment of the present invention a magnetic head is attached to a hollow carriage which surrounds a hollow cylindrical positioner post rigidly secured at one end to a frame element of a tape drive. Precision ball bearings mounted to the carriage engage the outer surface of the cylindrical positioner post at longitudinally and circumferentially spaced locations. A positioner shaft extends through the positioner post and a tracking nut in one end of the carriage is screwed over a threaded segment of the shaft. A pin extends from the carriage and is longitudinally slidable in a recess in an anti-rotation block mounted on the frame element. A stepper motor can drive the shaft to reciprocate the carriage toward and away from the frame element thereby moving the head traversely with respect to a length of magnetic tape. An adjustable stop on the post limits movement of the carriage toward the frame element.

BRIEF DESCRIPTION OF THE DRAWINGS

FIG. 1 is a top plan view of a portion of the cartridge tape drive incorporating a preferred embodiment of the magnetic head bearing of the present invention. In FIG. 1, the rear side of the magnetic head is attached to the bearing and the scrub surface of the head in operative engagement with the tape of an inserted cartridge.

FIG. 2 is an enlarged, vertical sectional view of the magnetic head bearing taken along line 2—2 of FIG. 1. The compression spring inside the head bearing is broken away.

FIG. 3 is a vertical sectional view taken along line 3—3 of FIG. 2 and illustrating one side of the magnetic head bearing in elevation.

FIG. 4 is a horizontal sectional view of the bearing taken along line 4—4 of FIG. 3 and illustrating the surrounding parts in plan view.

FIG. 5 is a side elevational view of the magnetic head bearing taken from the right side of FIG. 3 and illustrating the stop adjustment means.

FIG. 6 is a horizontal sectional view taken along lines 6—6 of FIG. 5 further illustrating the stop adjustment means.

DESCRIPTION OF THE PREFERRED EMBODIMENT

Referring to FIG. 1, the preferred embodiment 10 of the magnetic head bearing of the present invention is illustrated as part of a cartridge tape drive of the type disclosed in the aforementioned pending U.S. patent application Ser. No. 441,762. That tape drive includes a frame element in the form of a pivoted rigid deckplate 12. The deckplate 12 carries a magnetic head 14 supported by the bearing 10 into and out of engagement with the magnetic tape 16 of a cartridge 17. The cartridge has a hinged tape covering door 18 which normally seats in a cut-out region 19 in the side edge of the cartridge. The door 18 is opened when the cartridge 17 is inserted into the drive from the left in FIG. 1 by a finger mechanism 20. Upon insertion of the cartridge 17, manual rotation of a lever 21 causes the deckplate 12 to swing through a small amount of arc in FIG. 1 moving the head 14 upwardly into engagement with the tape 16. A capstan drive roller 22 mounted on the shaft of a brushless DC motor 23 engages and rotates the belt capstan roller (not illustrated) of the tape cartridge 17.

Referring to FIG. 3, the bearing 10 includes a hollow vertically extending, rectangular carriage 24. The magnetic head 14 is rigidly mounted to the front side of the carriage block so that its convex scrub surface 26 is in position for engaging the magnetic tape 16 as it moves past the head. The magnetic head has a gap (not illustrated) which must be precisely aligned with one of the multiple data tracks (not illustrated) which are positioned one above the other in FIG. 3 and extend longitudinally along the length of the tape. A wide variety of magnetic heads may be utilized, such as that disclosed in U.S. Pat. No. 4,110,804 assigned to IBM or U.S. Pat. No. 4,300,179 assigned to 3M.

The magnetic head 14 has a projection 28 (FIG. 3) which extends from the rear side thereof and fits snugly within a conformably shaped recess in the front side of the carriage 24. A flexible, multiple electrical connector bus (not illustrated) extends from the head 14 and is connected to electronic circuitry carried on PC boards (not illustrated) within the tape drive.

The carriage 24 travels up and down about a hollow, open-ended cylindrical head positioner post 10 (FIGS. 2-4). For stability and precision alignment, the carriage rides on the post via upper and lower sets of precision roller means in the form of ring-type ball bearings 32-37. Preferably, the ball bearings 32-37 are of the high precision type, such as ball bearings having tolerances of between about 0.0003 and 0.006 inches available from NMB Corporation, of Chattsworth, Calif. The upper set of ball bearings 32-34 establish three-point contact with the post 30. The same is also true of the lower set of ball bearings 35-37. The ball bearings of each set are spaced circumferentially about the post 30 roughly a co-equal distance apart.

The carriage 24 has upper and lower pairs of arcuate cut-out regions 38 (FIG. 3) which communicate with the hollow interior of the carriage. The ball bearings 32, 33, 35 and 36 are each positioned within corresponding ones of the cut-out regions 38 and are journaled on corresponding stub shafts 40 (FIG. 4). The inner end of each stub shaft 40 fits tightly in a corresponding hole 42 formed in the carriage 24 and extending substantially tangent to the cylindrical surface of the head positioner post 30.

Vertically extending, upper and lower rectangular apertures 44 (FIG. 5) on the rear side of the carriage 24 communicate with the hollow interior thereof. The ball bearings 34 and 37 are each journaled on corresponding rear bearing shafts 46 (FIG. 4). Each rear bearing shaft 46 seats in a corresponding horizontally extending recess 48 (FIG. 4) formed in the rear side of the carriage 24. The ball bearings 34 and 37 carried by the shafts 46 protrude through the corresponding recesses 44 and into engagement with the cylindrical head positioner post 30.

The legs of an H-shaped leaf spring 50 (FIGS. 3 and 5) press against the ends of the rear bearing shafts 46 to hold them in position. The leaf spring 50 is securely attached to the rear side of the carriage 24 by a screw 52. Thus, the rear ball bearings 34 and 37 are yieldingly urged or biased against the cylindrical head positioner post 30. The spring loading of the rear ball bearings 34 and 37 pulls the four fixed ball bearings 32, 33, 35 and 36 into contact with the post 30.

As illustrated in FIG. 2, the deckplate 12 has a hole 54 through which the lower end of the cylindrical head positioner post 30 extends. A flange 56 which extends from the lower end of the post seats against a shoulder 58 of the hole 54. An externally threaded lower end segment 60 of the post 30 extends through the lowermost portion of the hole 54 in the deckplate 12. A retaining nut 62 (FIGS. 2 and 3) is screwed over the lower threaded segment 60 of the head positioner post and is tightened to firmly hold the post in position.

Referring to FIG. 2, a head positioner shaft 64 extends vertically through the hollow interior of the head positioner post 30. The head positioner shaft 64 has a smooth intermediate segment 64a, an upper threaded segment 64b, and a smaller diameter, smooth lower segment 64c. The upper threaded segment 64b of the head positioner shaft is threadably engaged with and extends through a tracking nut 66 screwed into a hole in the top end of the carriage 24. The lower portion of the smooth intermediate segment 64a of the head positioner shaft is journaled in a ball bearing 68 press fit within the lower threaded segment 60 of the head positioner post 30. A flange 70 on the shaft 64 holds the ball bearing 68 in position.

A compression spring 72 (FIG. 2) surrounds the head positioner shaft 64 within the post 30 between the tracking nut 66 and a retaining ring 74. The retaining ring 74 has a gap or segment therein (not illustrated) so that it can be compressed and fit within an annular groove formed in the inner wall of the head positioner post 30. A washer 76 is positioner between the retaining ring 74 and the lower end of the compression spring 72. For the sake of clarity in FIG. 2, the intermediate segment of the compression spring 72 is not illustrated. The spring has been broken away to reveal the smooth intermediate segment 64a of the head positioner shaft. A spur gear 78 is rigidly mounted on the lower end segment 64c of the head positioner shaft.

The function of the compression spring 72 is to take up any "slop" or tolerance between the external threads of the upper segment 64b of the head positioner shaft and the internal threads of the tracking nut 66. In other words, the compression spring 72 continually forces the tracking nut 66 and thus the carriage 24 and head 14 to the uppermost position permitted by any gap between the threads of the head positioner shaft and the tracking nut. This eliminates any possibility of minute longitudinal movement between the head positioner shaft 64 and the guide nut 66 which might be able to occur without relative rotation therebetween so that it will not be a source of positioning error. The leaf spring 50 causes the ball bearings 32-37 to be tightly pressed against the cylindrical head positioner post 30, thus eliminating any positional error that might result from any one of the ball bearings not riding uniformly against the surface of the post 30 during vertical reciprocation of the carriage.

An idler gear 80 illustrated in phantom lines in FIG. 3 meshes with the spur gear 78 and is mounted to a shaft (not illustrated) mounted in an idler gear plate 82 secured to the underside of the deckplate 12. A drive gear 84, a portion of which is illustrated in phantom lines in FIG. 3, meshes with the idler gear 80. The drive gear 84 is mounted on the shaft of a stepper motor (not illustrated) which is energized by the servo circuitry to rotate the gear 78 and the head positioner shaft 64. Rotation of the upper threaded segment 64b of the head positioner shaft causes the tracking nut 66 to thread up and down the segment 64b, carrying the carriage 24 and the magnetic head 14 therewith. An anti-rotation pin 86 (FIG. 2) extends horizontally from the right side edge of the carriage 24 and vertically reciprocates within a slot 88 in an anti-rotation block 90. The anti-rotation block is rigidly mounted on a raised shoulder portion 92 of the deckplate 12. The anti-rotation block 90 is secured to the raised shoulder portion 92 of the deckplate by a screw 94.

The magnetic head bearing includes means for providing a reference point or zero location. Utilizing this location, the servo circuitry can move the carriage 24 vertically to position the gap of the magnetic head precisely over one of the multiple data tracks on the tape 16. In order to accomplish this, a segment 30a (FIG. 3) of the head positioner post above the flange 56 is externally threaded. An internally threaded stop gear 96 is screwed over the threaded segment 30a of the head positioner post. As previously indicated, the head positioner post 30 is rigidly mounted to the deckplate 12 and does not rotate. Accordingly, the height of the stop gear 96 on the post 30 can be adjusted by rotating the stop gear through mechanisms hereafter described. The lower end of the carriage 24 is engaged by the stop gear 96 to limit the downward movement of the carriage 24 and the magnetic head 14 carried thereby.

The remote end of a pawl 98 (FIG. 4) engages the stop gear 96 to fix the rotational position, and thus the height of the stop gear. The inner end of the pawl 98 rotates about a screw 100. The pawl 98 is biased into engagement with the stop gear 96 by a torsion spring 102 (FIG. 5) which engages the pawl intermediate its length at one end and is wrapped around the screw 100 at its other end. The height of the stop gear is initially set at the factory. If necessary the height of the stop gear is thereafter adjusted by maintenance personnel. This is done by inserting the tip 104 (FIG. 5) of a screwdriver-like adjustment tool 106 into a vertical hole 108 extending through the deckplate 12 between the screw 100 and the periphery of the stop gear. The tool 106 has a pinion gear 110 at its lower end, the underside of which is upwardly tapered. As the tip of the tool is inserted into the hole 108 in the deckplate, the tapered portion of the pinion gear engages the spring biased pawl 98 to move it out of engagement with the stop gear 96 and permit the pinion gear to engage and mesh with the stop gear as illustrated in FIG. 6. The tool may then be turned to rotate the stop gear 96, thereby threading it upwardly or downwardly on the threaded portion of the head positioner post 30.

The preferred embodiment of our magnetic head bearing which has been described in detail herein has demonstrated the capability to precisely position the magnetic head in a cartridge tape drive for reliably recording and reading data from one of twelve tracks of the same one-quarter magnetic tape cartridge. More importantly, the precision head bearing described herein has demonstrated the ability for accurately reading data from a magnetic tape cartridge of the type described herein which has been recorded in another, identically constructed tape drive. This precision magnetic head bearing therefore provides essential cartridge interchangeability between tape drives.

Having described a preferred embodiment of our magnetic head bearing, it should be understood that modifications and adaptations thereof will occur to those skilled in the art. Accordingly, the protection afforded our invention should be limited only in accordance with the scope of the following claims.

We claim:

1. A bearing for supporting a transducer for movement relative to a magnetic storage medium comprising:
    an open-ended elongate hollow cylindrical positioner post;
    means for rigidly mounting one end of the post to a frame element;
    an elongate carriage surrounding the post for supporting the transducer;
    a plurality of precision roller means;
    means for rotatably mounting the roller means to the carriage so that the roller means engage the post at longitudinally and circumferentially spaced locations to permit the carriage to reciprocate along the post;
    a positioner shaft extending coaxially through the post and having a threaded segment;
    tracking means rigidly mounted at one end of the carriage and screwed over the threaded segment of the positioner shaft; and
    means for preventing rotation of the carriage relative to the frame element while permitting the carriage to reciprocate along the post;
    whereby rotation of the positioner shaft will move the transducer relative to the frame element.

2. A bearing according to claim 1 wherein the precision roller means comprise ball bearings.

3. A bearing according to claim 1 wherein there are two longitudinally spaced sets of three precision roller means surrounding the post.

4. A bearing for supporting a transducer for movement relative to a magnetic storage medium comprising:
    an open-ended elongate hollow cylindrical positioner post;
    means for rigidly mounting one end of the post to a frame element;
    an elongate carriage surrounding the post for supporting the transducer;
    a plurality of precision roller means;
    means for rotatably mounting the roller means to the carriage so that the roller means engage the post at longitudinally and circumferentially spaced locations to permit the carriage to reciprocate along the post;
    a positioner shaft extending through the post and having a threaded segment;
    tracking means rigidly mounted at one end of the carriage and screwed over the threaded segment of the positioner shaft;
    means for adjustably limiting the amount of possible movement of the carriage toward the frame element;
    means for preventing rotation of the carriage relative to the frame element while permitting the carriage to reciprocate along the post; and
    whereby rotation of the positioner shaft will move the transducer relative to the frame element.

5. A bearing according to claim 4 wherein the adjustable limiting means includes a stop gear screwed over a threaded segment of the post and means for releasably locking the position of the stop gear.

6. A bearing according to claim 3 wherein at least one roller means of each set is resiliently urged toward the post.

7. A bearing according to claim 1 and further comprising a compression spring within the post and surrounding the positioner shaft for urging the tracking means longitudinally with respect to the threaded segment of the shaft.

8. A bearing according to claim 1 and further comprising a ball bearing rotatably supporting the positioner shaft within the positioner post.

9. A bearing according to claim 5 wherein the releasable locking means comprises a spring biased pawl normally engaging the stop gear.

10. A bearing according to claim 1 wherein the plurality of precision roller means includes:
   first and second longitudinally spaced sets of three roller bearings mounted on shafts connected to the carriage so that the roller bearings of each set are roughly spaced circumferentially a co-equal distance apart; and
   means for resiliently urging one roller bearing of each set into engagement with the post.

11. A carriage assembly for supporting a transducer for movement relative to a magnetic storage medium comprising:
   an elongated positioner post having a bore extending along the length thereof;
   means at one end of said positioner post for rigidly securing said positioner post to a support member;
   an elongated carriage surrounding said positioner post;
   a plurality of precision roller means rotatably mounted on the carriage for engaging the positioner post at longitudinally and circumferentially spaced positions for supporting the carriage for reciprocation along the positioner post;
   a positioner shaft extending coaxially through the bore of the positioner post and having a threaded segment; and
   nut means mounted on the carriage and engaging the threaded segment of the positioner shaft for connecting said carriage to the positioner shaft so that rotation of the positioner shaft moves the carriage along the positioner post.

12. A carriage assembly according to claim 11 wherein said roller means comprises three rollers at each longitudinally spaced location that are substantially equally spaced circumferentially around said positioner post.

13. A carriage assembly according to claim 11 wherein said positioner post has a generally cylindrical outer surface and said carriage is concentrically mounted on said positioner post.

14. A carriage assembly according to claim 13 wherein said roller means comprises three rollers at each longitudinally spaced location and said rollers are substantially equally spaced around said positioner post.

15. A carriage assembly according to claim 14 wherein one of said rollers of each of said roller means is spring biased into engagement with said positioner post for eliminating slack in said roller means.

16. A carriage assembly according to claim 11 comprising spring means biasing said nut means in one direction against the threaded segment of the positioner shaft for eliminating backlash therebetween.

17. A carriage assembly according to claim 15 comprising spring means biasing said nut means in one direction against the threaded segment of the positioner shaft for eliminating backlash therebetween.

18. A carriage assembly for supporting a transducer for movement relative to a magnetic storage medium comprising:
   an elongated hollow cylindrical positioner post;
   means for rigidly mounting one end of the post to a support member;
   an elongated generally tubular carriage mounted concentrically with and surrounding the post for supporting a transducer;
   a plurality of precision roller means positioned longitudinally along and circumferentially surrounding the positioner post for supporting the carriage for reciprocal movement along the post;
   each of said roller means including resilient biasing means for biasing said roller means into engagement with said positioner post for eliminating slack between said carriage and said positioner post;
   a positioner shaft rotatably mounted and extending coaxially along the positioner post and having a threaded portion thereon; and
   a tracking nut mounted on the carriage and threadably engaging the threaded portion of the positioner shaft for connecting the carriage to the positioner shaft for movement of the carriage along the positioner post upon rotation of the positioner shaft.

19. A carriage assembly according to claim 18 wherein said roller means comprises a plurality of rollers spaced around said shaft at each of said longitudinal locations and said resilient means comprises a leaf spring secured to said carriage and engaging and biasing one roller of each of said spaced roller means into engagement with said positioner post; and
   compression spring means surrounding said positioner shaft for biasing said tracking nut in one direction against the threads on said positioner shaft for eliminating backlash therein.

* * * * *